United States Patent [19]

Beneke et al.

[11] Patent Number: 5,012,551
[45] Date of Patent: May 7, 1991

[54] FURNITURE HINGE

[75] Inventors: Ulrich Beneke, Bünde; Jürgen Gross, Enger; Wilfried Oepping, Kirchlengern; Manfred Schnelle; Günter Sundermeier, both of Bünde, all of Fed. Rep. of Germany

[73] Assignee: Paul Hettich Gmbh & Co., Kirchlengern, Fed. Rep. of Germany

[21] Appl. No.: 415,268
[22] PCT Filed: Nov. 25, 1988
[86] PCT No.: PCT/DE88/00729
§ 371 Date: Aug. 15, 1989
§ 102(e) Date: Aug. 15, 1989
[87] PCT Pub. No.: WO89/05388
PCT Pub. Date: Jun. 15, 1989

[30] Foreign Application Priority Data

Dec. 9, 1987 [DE] Fed. Rep. of Germany ....... 3741712

[51] Int. Cl.$^5$ .............................................. E05F 3/00
[52] U.S. Cl. ............................................ 16/49; 16/54; 16/57; 16/58; 16/82; 16/DIG. 9
[58] Field of Search .................. 16/54, 58, 68, 82, 84, 16/DIG. 9, DIG. 21, 49, 50

[56] References Cited

U.S. PATENT DOCUMENTS

| 1,159,697 | 11/1915 | Miles et al. | 16/57 |
| 2,161,101 | 6/1939 | Simms | 16/57 |
| 2,437,192 | 3/1948 | Glanz . | |
| 2,953,810 | 9/1960 | Hall . | |
| 3,259,937 | 7/1966 | Kotikov | 16/58 |
| 4,196,924 | 4/1980 | Iseki | 16/84 |
| 4,431,030 | 2/1984 | Nachazel | 16/84 |
| 4,669,147 | 6/1987 | Suchanek | 16/58 |

FOREIGN PATENT DOCUMENTS

| 941264 | 3/1956 | Fed. Rep. of Germany | 16/49 |
| 1155030 | 9/1963 | Fed. Rep. of Germany . | |
| 1280076 | 11/1961 | France . | |
| 2576994 | 1/1986 | France . | |
| 6224048 | 2/1987 | Japan . | |

Primary Examiner—Kurt Rowan
Assistant Examiner—Edward A. Brown
Attorney, Agent, or Firm—Peter K. Kontler

[57] ABSTRACT

A furniture hinge has a hinge arm connectible to the body of a piece of furniture and a lever connectible to a closure for the furniture. The closure is movable between a closed position and an open position. A damping device is disposed between the hinge arm and the lever and includes a housing having a bellows-like first part and a second part secured to the hinge arm. A piston rides in the housing and divides it into first and second chambers. The piston is provided with flow channels which allow hydraulic fluid in the housing to flow between the first and second chambers. The piston is mounted on a rod which extends through, and is coupled to, the first housing part and is articulately connected to the lever. A sealing member likewise mounted on the rod is arranged to seal the flow channels upon movement of the closure to its closed position. As the closure moves to its open position, the rod moves out of the housing with an accompanying expansion of the first housing part and unblocking of the flow channels. The pressure in the first chamber is reduced so that the fluid enters this chamber via the flow channels. Upon movement of the closure to its closed position, the rod moves into the housing and the flow channels are sealed. Fluid then flows from the first chamber to the second chamber by leakage. This may be accomplished by providing the sealing member with a slit and making the second housing part or the sealing member elastically deformable. Alternatively, the piston may be formed with an elastically deformable sealing lip which engages the inner surface of the housing.

38 Claims, 6 Drawing Sheets

FURNITURE HINGE

BACKGROUND OF THE INVENTION

The invention relates to a furniture hinge having hinge components which can be affixed to the body of the furniture and to a door or cover and also having at least one lever which is articulately connected with these hinge components.

Most furniture hinges of this type are equipped with a spring mechanism which automatically closes the door, the cover or the like. The closing motion due to the spring force frequently leads to disturbing slamming sounds.

In many cases, externally acting forces, e.g., resulting from manual manipulation of the door panel, are superimposed on the closing force due to the spring mechanism. This can intensify the closing sounds of the door or the like.

SUMMARY OF THE INVENTION

It is an object of the invention to design a furniture hinge of the above type so that disturbing closing sounds are eliminated and externally applied closing or opening forces are damped.

According to the invention, this object is achieved in that a damping device provided with an incompressible hydraulic medium is arranged between the lever and a hinge component and includes a piston rod which is articulated to the lever, a piston secured to the piston rod and a cylinder affixed to the hinge component and receiving the piston. The cylinder is provided with an end cap which has a central through opening for the piston rod and defines two chambers with the piston and the cylinder. Transfer openings or channels for the hydraulic medium are provided in the region of the piston.

In the furniture hinge of the invention, the damping device is disposed between functional components of the furniture hinge without the need to change the dimensions and/or the structure of the hinge components to be affixed to the body of the furniture and to the door or cover.

Since furniture hinges are mass produced articles having limited allowable cost, the damping device must likewise be economical to manufacture and mount.

The damping device in accordance with the invention must be able to withstand the normal loading situation in which the door, the cover or the like is closed by the relatively small force of the closing spring of the furniture hinge as well as the exceptional situation in which the door or the like is activated by external influences such as manual pushing of the door to the closed position or manual opening of the door.

In an advantageous embodiment of the furniture hinge of the invention, the end cap anchored to the cylinder is constructed as an elastically deformable bellows having a through channel for the piston rod, and the end cap is fixed to the piston rod in a fluidtight fashion in the region of this through channel. The through channel can have an inwardly projecting annular bead which extends into an annular groove of the piston rod.

Due to the elasticity of the bellows-shaped end cap and the inwardly projecting annular bead, a lock with respect to both force and shape is developed between the covering cap and the piston rod in the region of the through channel. As a result of this connection, sliding friction between the piston rod and the covering cap is avoided during operation of the damping device. Furthermore, the covering cap is deformed in a direction towards the cylinder during the closing motion of the hinge.

Prior to initiation of the opening motion of the door or the furniture hinge, the damping fluid is to be found in the chamber bounded by the bellows-shaped end cap and the piston. If the opening motion is performed very rapidly by hand, the covering cap is elastically deformed so that the piston rod can follow the rapid opening motion. A subatmospheric pressure is then developed in the second cylinder chamber thereby causing a vapor bubble to form and forcing the hydraulic fluid to flow out of the first chamber into the second at increased speed so that the elastic deformation of the covering cap is reversed and the opening motion can be carried out virtually undamped.

If, during the closing motion of the hinge which is checked by the damping device, a load peak arises, the flow cross section between the two chambers of the damping device can be increased by elastic deformation of the cylinder and/or the piston. After disappearance of the load peak, this increase in the flow cross section is reversed.

BRIEF DESCRIPTION OF THE DRAWINGS

Additional features of the invention are set forth in the following description of advantageous exemplary embodiments illustrated in the drawings where.

DESCRIPTION OF THE PREFERRED EMBODIMENTS

Figure 1:
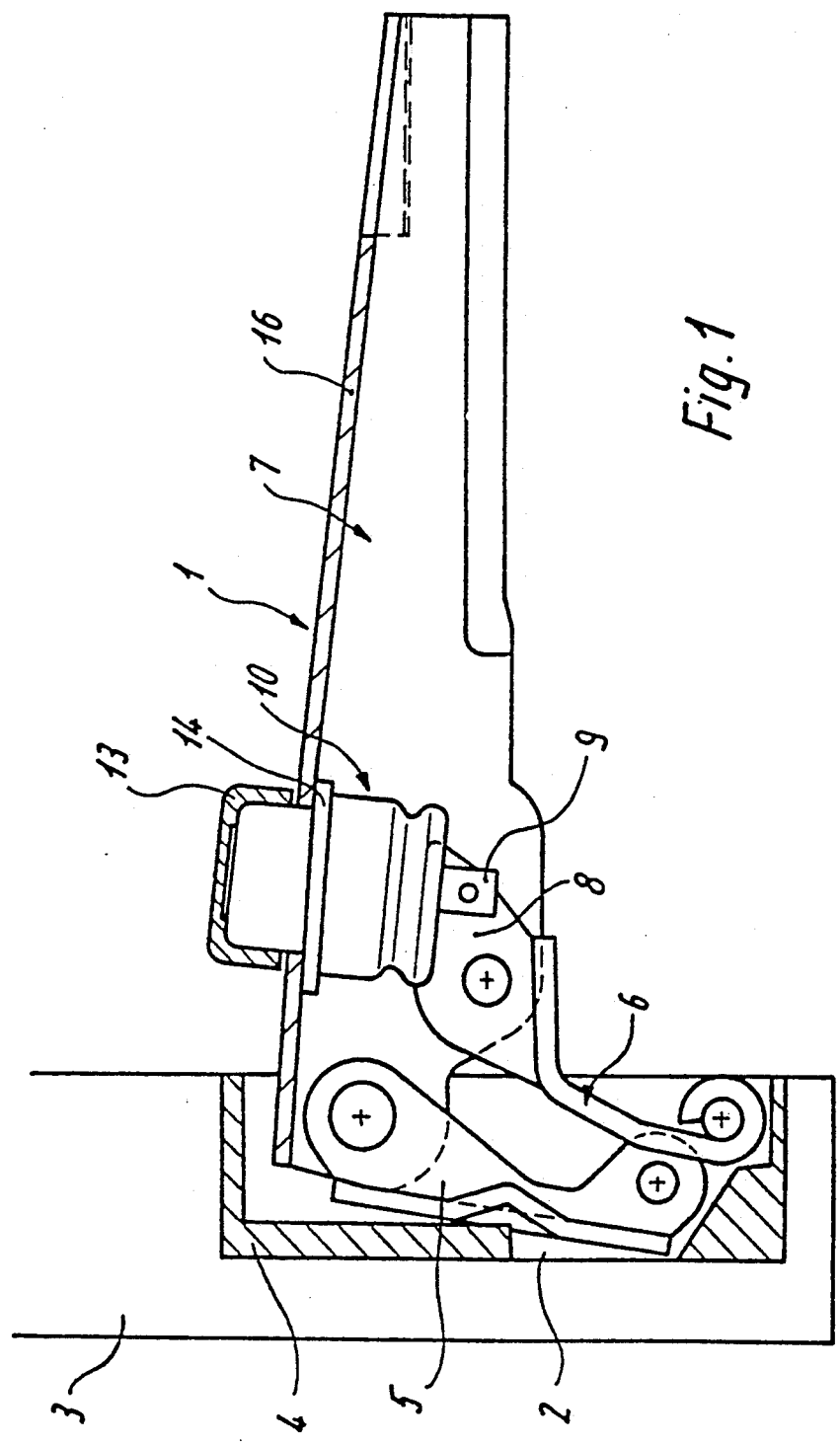
FIG. 1 shows a furniture hinge which is equipped with a damping device and is in the closed position.
Figure 2:
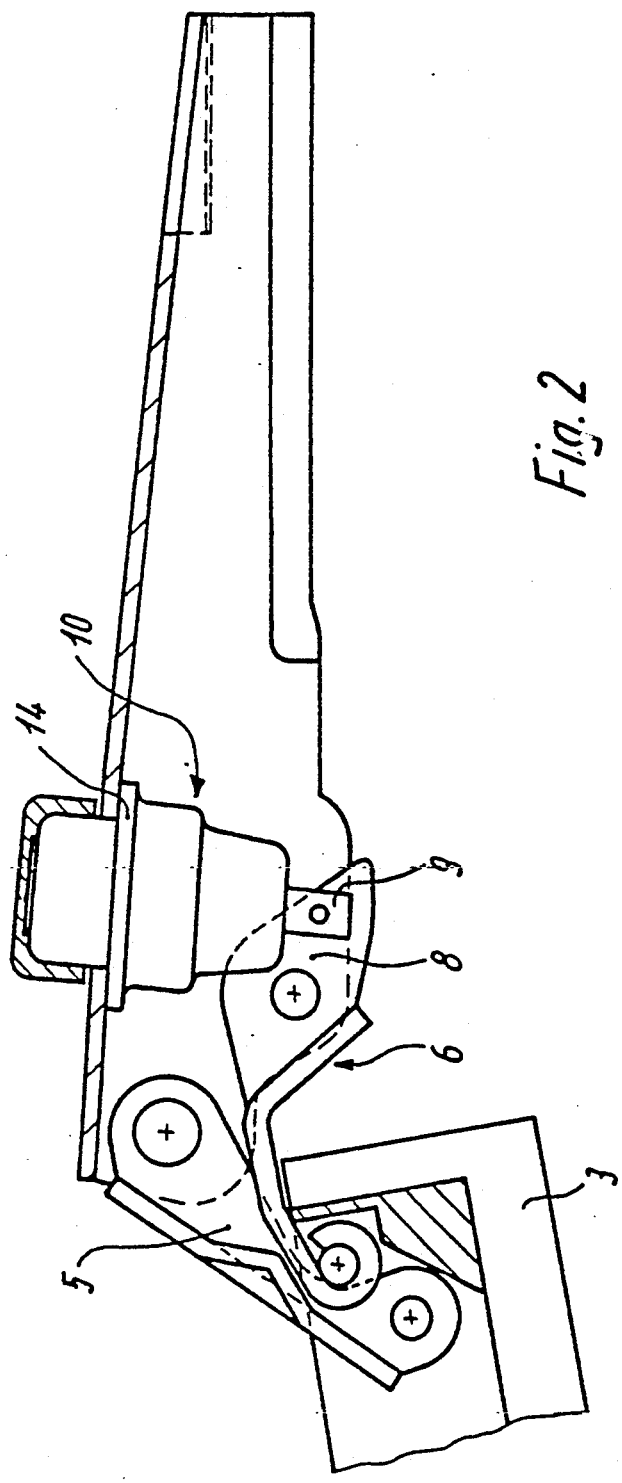
FIG. 2 shows the furniture hinge of FIG. 1 in the open position.

The furniture hinge of FIGS. 1 and 2 has a pot-like housing 4 which is arranged and fixed in a recess 2 of a furniture door 3 and is articulately connected via levers 5 and 6 to a hinge arm 7 secured to the body of the furniture.

The lever 6 is constructed as a two-armed lever and has a lever arm 8 which is articulately connected to a piston rod 9 of a damping device 10. This piston rod extends into a housing of the damping device which as best seen in FIG. 6, is defined by a bellows-shaped covering cap 11 of elastic material, a cylinder 12 and a pot-shaped cap 13 which is disposed on the cylinder in an inverted position.

The cylinder is equipped with an annular flange 14 and projects through a bore 15 (see FIG. 6) in a wall 16 of the hinge arm 7. The annular flange 14 lies against the inner side of the wall 16 of the hinge arm 7 while the cap 13 extends to the vicinity of the hinge arm.

FIGS. 1 and 2 show that the damping device 10 is integrated in the structure of the furniture hinge and requires no significant redesign of the functional components of this hinge.

Figure 6:
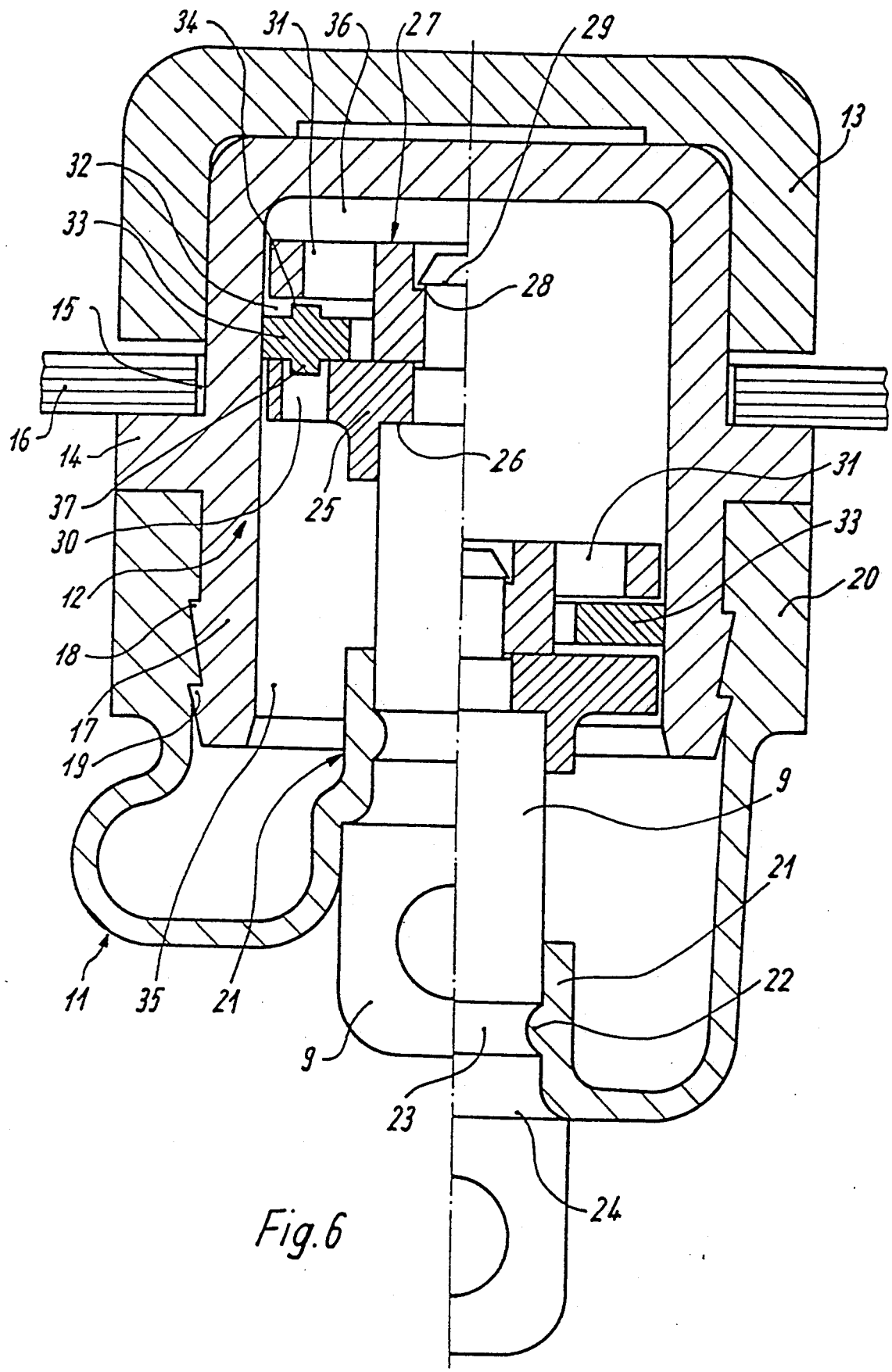
FIG. 6 is a vertical section through the damping device of FIGS. 3 to 5 showing the closed position of the furniture hinge on the left and the open position on the right.

As shown in FIG. 6, the cylinder 12 includes a cylindrical portion 17 which extends from the annular flange 14, is open-ended and, at its outer periphery, is equipped with anchoring ribs 18,19 to which a fastening flange 20 of the covering cap 11 is affixed.

The covering cap is equipped with an inwardly extending stub 21 which defines a through channel for the piston rod 9.

The central region of the stub 21 is provided with an inwardly projecting annular bead 22 which engages in an annular groove 23 of the piston rod 9.

FIG. 6 shows that the outer end of the stub 21 lies against a shoulder 24 of the piston rod 9.

The covering cap 11 is constructed in a bellows-like fashion between the fastening flange 20 and the stub 21. It is made of an elastically deformable material, e.g., rubber or a rubber-like plastic. It can deform elastically in response to increased pressure from the damping fluid and, due to its flexibility, can follow the movement of the piston rod between the closed and open positions of the furniture hinge.

In the embodiment of the damping device 10 according to FIGS. 3 to 6, a piston 25 is provided at the free end of the piston rod 9, bears against a shoulder surface 26 of the piston rod and is fixed by a retaining ring 27 which can be snapped onto the piston rod. An arresting edge 28 of the retaining ring 27 engages behind an abutment surface 29 of the piston rod.

The outer diameter of the piston 25, as well as that of the retaining ring 27, is smaller than the inner diameter of the cylinder 12.

Flow channels 30,31 are arranged in the piston 25 and the retaining ring 27.

The piston 25 and the retaining ring 27 define a receiving groove 32 for a piston ring 33 which is axially movable in this receiving groove.

The side of the piston ring 33 facing the retaining ring 27 is equipped with a distancing cam 34 which bears against the underside of the retaining ring 27 during the opening stroke of the piston and establishes a flow connection between the chamber 35 and the chamber 36 of the cylinder. In this operating position, the piston ring 33 frees the flow channel or flow channels 30 in the piston.

The side of the piston ring facing the piston has a in 37 which engages in a flow channel 30 of the piston 25 and constitutes a means for preventing rotation of the piston ring relative to the piston.

The outer diameter of the piston ring 33 corresponds to the inner diameter of the cylinder 12.

Figure 4:
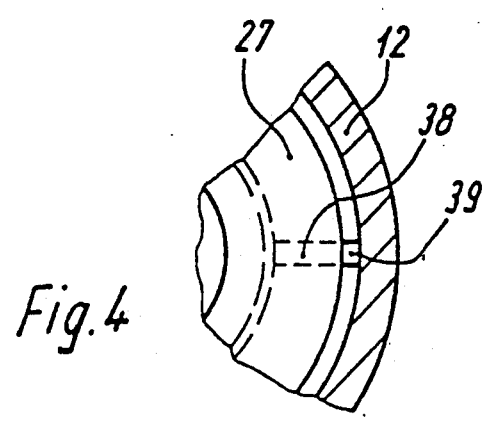
FIG. 4 is a view in the direction of the arrow IV in FIG. 3.

The piston ring is equipped with a slit 38 which extends across the entire width of the ring. FIG. 4 shows that the retaining ring 27 has no flow channel 31, and the piston 25 has no flow channel 30, in the region of the slit 38. Even when the slit 38 is largely covered by the retaining ring 27 or by the piston 25, a portion of the slit, which is identified by the reference numeral 39 in FIG. 4, remains as a flow cross section.

In order to ensure that the flow opening 39 of the slit 38 remains unobstructed, i.e., is not accidentally distorted in any operating phase by lateral play of the piston 25, the periphery of the piston 25 can be provided with guiding cams, recesses and/or flattened areas which are arranged so as to create a free space between the peripheral surface of the piston and the wall of the cylinder at least in the region of the flow opening 39.

Figure 3:
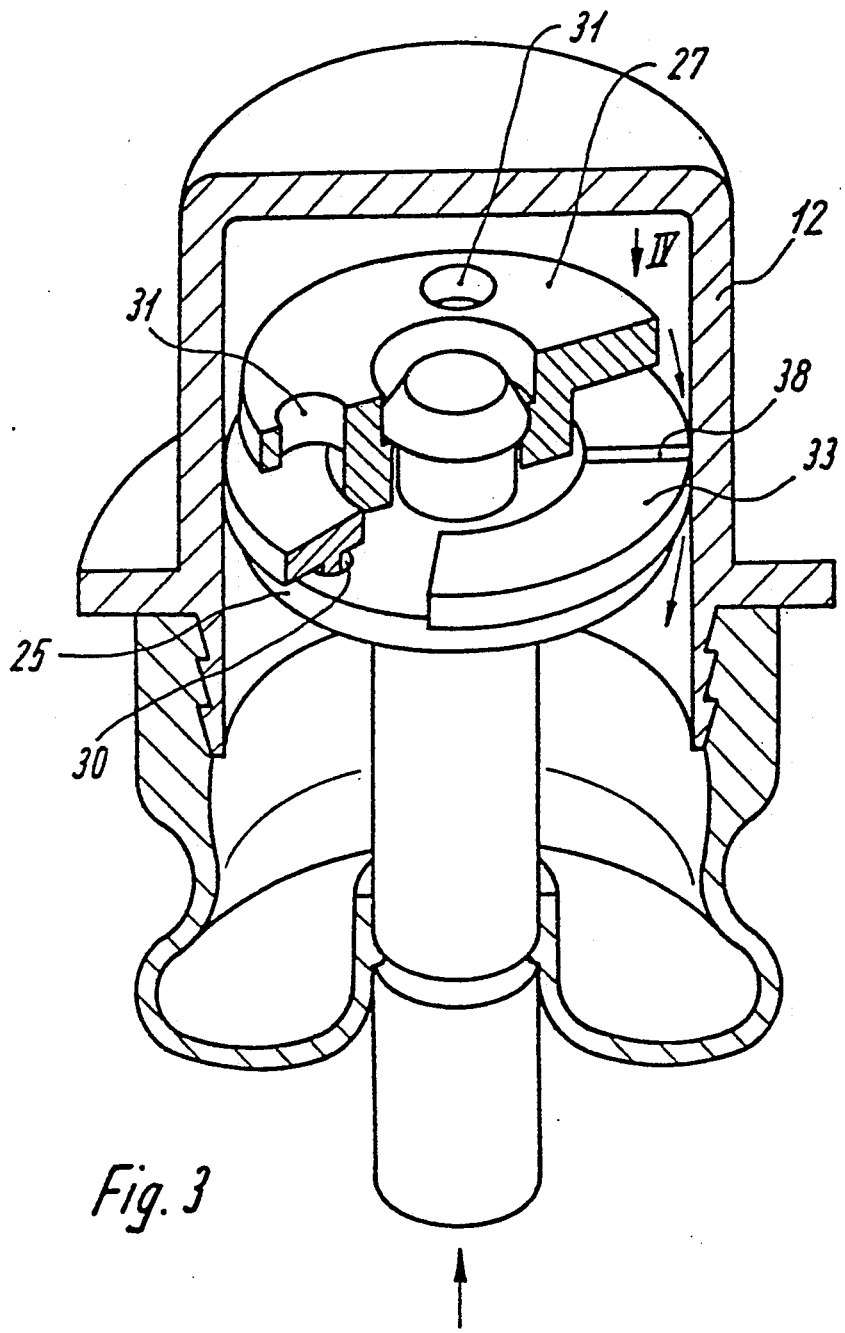
FIG. 3 is a sectional perspective view of one embodiment of the damping device.

FIGS. 3 and 6 show that the flow channels 30 are closed by the piston ring 33 during movement of the piston to the closed position (or terminal position) so that the portion 39 of the piston ring 33 remains as the sole flow cross section.

If the pressure of the damping fluid in the chamber 36 is increased by forces applied to the door from externally, the flow cross section can be enlarged in that the cylinder 12 is made of an elastically deformable material and thus deforms elastically during this load peak so that the cylinder wall moves away from the piston ring 33 and an additional flow cross section is created.

Figure 5:
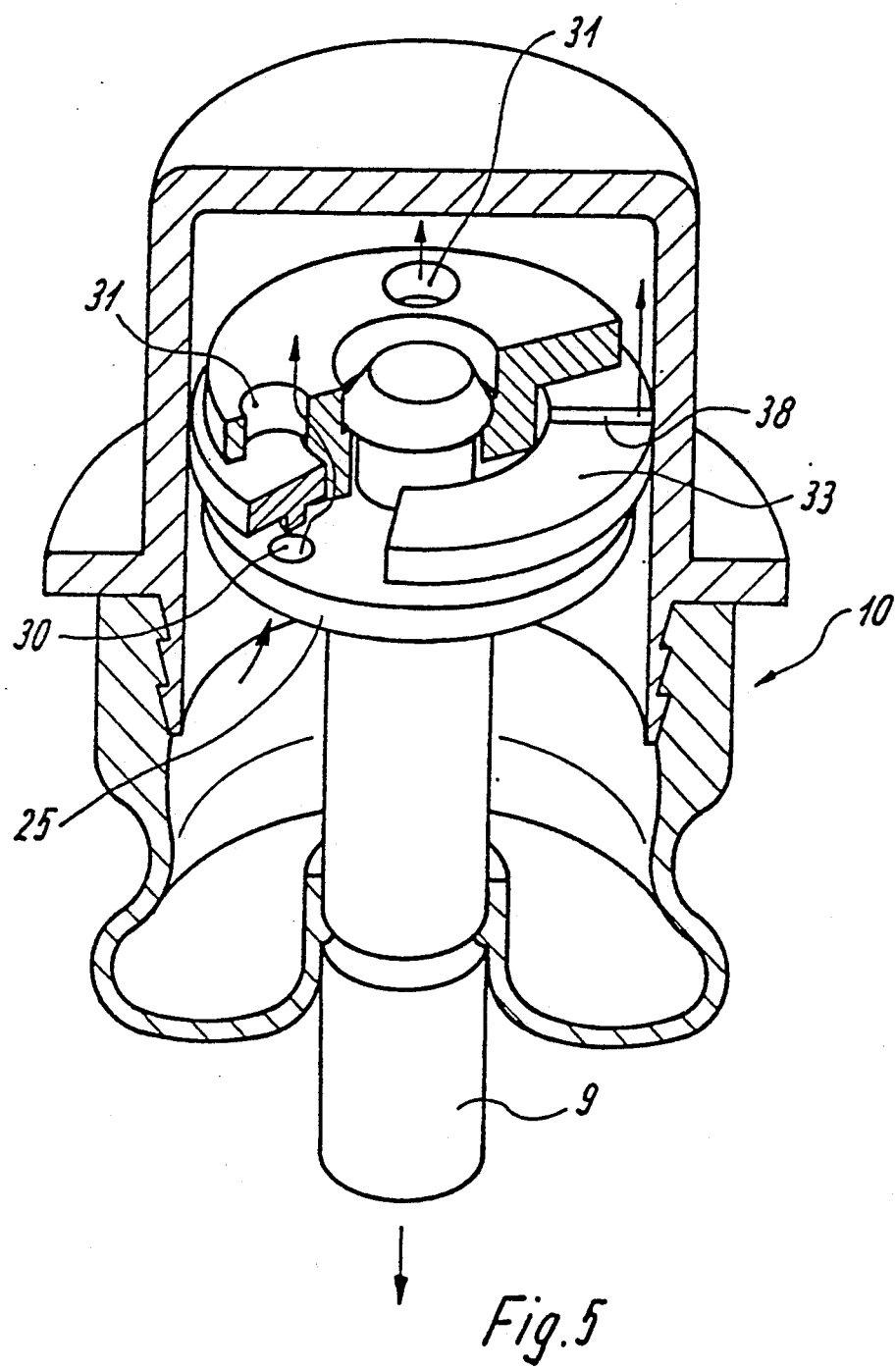
FIG. 5 shows the damping device of FIG. 3 during the opening motion.

If the piston is moved from the closed position to the open position illustrated in FIG. 5, the piston ring 33 in the receiving groove 32 assumes an intermediate position determined by the distancing cam 34 so that the damping fluid can flow from the chamber 35 to the chamber 36 through the flow channels 30 and 31.

Figure 7:
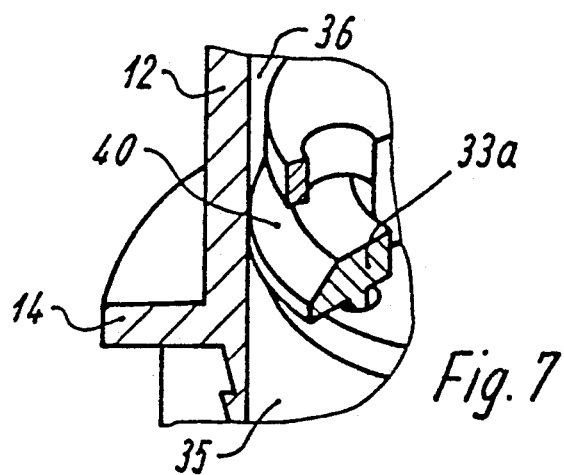
FIG. 7 is a fragmentary view of another embodiment of the damping device.

When the cylinder 12 is made of a non-elastic material as in the embodiment of FIG. 7, load peaks arising during the closing stroke of the piston can be counteracted by providing the side of the piston ring 33a which faces the chamber 36 with an inclined surface 40. During a load peak, the latter is subjected to an increased pressure from the chamber 36 so that the piston ring is compressed in the region of the slit 38 and an additional flow cross section is thereby generated between the piston ring and the inner wall of the cylinder.

Figure 8:
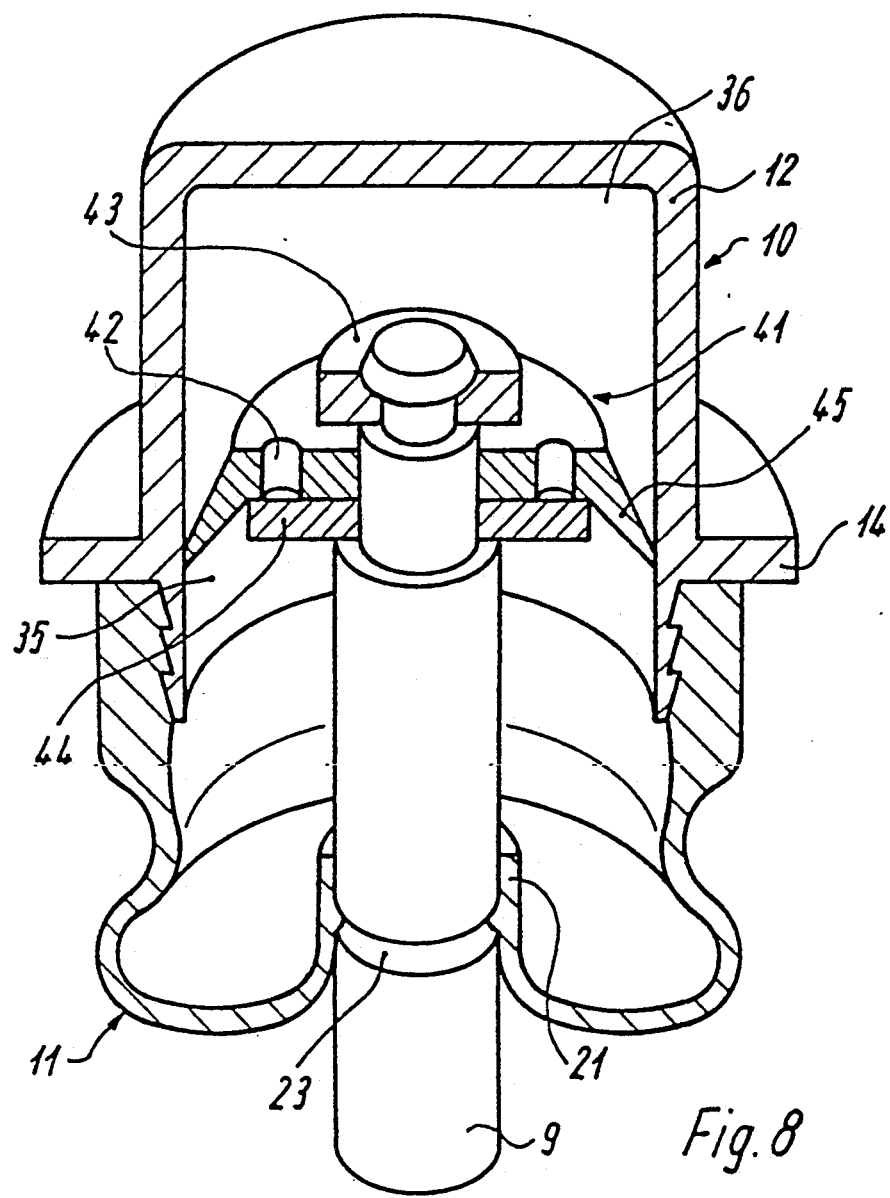
FIG. 8 is a sectional perspective view of a further embodiment of the damping device.

Another exemplary embodiment of the damping device 10 is illustrated in FIG. 8.

In this construction, the piston 41 is equipped with flow channels 42 and is slidably mounted at the free end of the piston rod 9 between a retaining ring 43 fixed to the end of the piston rod and a cover plate 44 for the flow channels 42.

During the opening stroke of the piston 41, the latter lies against the retaining ring 43 so that the damping fluid can flow out of the chamber 35 into the chamber 36 through the channels 42.

During the closing stroke of the piston, the piston assumes the operating position shown in FIG. 8. The flow channels 42 are closed by the cover plate 44 so that the damping fluid can flow out of the chamber 36 into the chamber 35 only when the circumferentially complete sealing lip 45 lying against the inner wall of the cylinder is elastically deformed inwards by the fluid pressure in the chamber 36 thereby creating a free cross section between the sealing lip and the inner wall of the cylinder.

In this embodiment, the piston 41 must thus consist of an elastically deformable material. It is preferably made of rubber or a rubber-like plastic.

We claim:

1. A hinge for an item of furniture having a main structure and a closure for the main structure, comprising a first hinge component mountable on the main structure; a second hinge component mountable on the closure; and a damping device located in one of said first and second hinge components connecting said first and second components, said damping device including a housing defining at least a portion of the exterior of said damping device having a compartment, a partition in said compartment dividing the latter into first and second chambers, a body of hydraulic fluid in said compartment, and means for transferring said fluid between said chambers, said housing including an elastically deformable housing part.

2. The hinge of claim 1, wherein said fluid is substantially incompressible.

3. The hinge of claim 1, wherein one of said components comprises a lever designed for articulation.

4. The hinge of claim 3, wherein said damping device includes a rod having a first end portion which is connected to said partition and a second end portion which is articulately connected to said lever, said housing being secured to the other of said components.

5. The hinge of claim 1, wherein said partition includes a piston.

6. The hinge of claim 1, wherein said housing includes a cylinder having an open end, and a cover for said open end.

7. The hinge of claim 6, wherein said damping device includes a rod having a first end portion which is connected to said partition and a second end portion which is connected to one of said components, said cover being provided with a substantially centrally located passage, and said rod extending through said passage.

8. The hinge of claim 6, wherein said cylinder has an end wall remote from said cover, said end wall and said partition cooperating to define one of said chambers, and said cover and said partition cooperating to define the other of said chambers.

9. The hinge of claim 1, wherein said transferring means comprises flow channels in the region of said partition.

10. The hinge of claim 1, wherein said housing part is bellows-like.

11. The hinge of claim 1, wherein said damping device includes a rod having a first end portion which is connected to said partition and a second end portion which is connected to one of said components, said housing part being provided with a passage, and said rod extending through, and being fixed to said housing part in a substantially fluidtight manner in the region of said passage.

12. The hinge of claim 11, wherein said rod is provided with a groove, said housing part including a tubular portion defining said passage, and said tubular portion having a projection which is received in said groove.

13. The hinge of claim 12, wherein said groove and said projection are substantially annular.

14. The hinge of claim 12, wherein said tubular portion has a central region and said projection is disposed in said central region.

15. The hinge of claim 12, wherein said rod has a shoulder and said tubular portion has an end portion facing outward of said housing, said end portion bearing against said shoulder.

16. The hinge of claim 1, wherein said housing part comprises rubber or a rubber-like plastic.

17. The hinge of claim 1, wherein said housing has a flange, a tubular section extending from said flange and having an open end, and a cover for said open end, said tubular section and said cover being provided with cooperating rib-like elements for securing said cover to said tubular section.

18. The hinge of claim 17, wherein said flange is substantially annular.

19. A hinge for an item of furniture having a main structure and a closure for the main structure, comprising a first hinge component mountable on the main structure; a second hinge component mountable on the closure; and a damping device located in one of said first and second hinge components connecting said first and second components, said damping device including a housing defining at least a portion of the exterior of said damping device having a compartment, a partition in said compartment dividing the latter into first and second chambers, a body of hydraulic fluid in said compartment, and means for transferring said fluid between said chambers, said housing having a flange, a tubular section extending from said flange and having an open end, and a cover for said open end, said tubular section and said cover being provided with cooperating rib-like elements for securing said cover to said tubular section, one of said components including a wall having oppositely facing first and second surfaces, and said wall being provided with a bore which extends between said surfaces, said flange bearing against said first surface, and said housing having another section which is located on the side of said flange remote from said tubular section and projects through said bore, said damping device further comprising a retaining element which at least partially surrounds said other section.

20. The hinge of claim 19, wherein said one component is said first component.

21. The hinge of claim 19, wherein said one component comprises a hinge arm which includes said wall.

22. The hinge of claim 19, wherein said one component has a hollow interior and said first surface is located in said hollow interior.

23. The hinge of claim 19, wherein said retaining element comprises a cap having a skirt which terminates proximate to said flange.

24. A hinge for an item of furniture having a main structure and a closure for the main structure, comprising a first hinge component mountable on the main structure; a second hinge component mountable on the closure; and a damping device located in one of said first and second hinge components connecting said first and second components, said damping device including a housing defining at least a portion of the exterior of said damping device having a compartment, a partition in said compartment dividing the latter into first and second chambers, a body of hydraulic fluid in said compartment, and means for transferring said fluid between said chambers, said housing including a cylinder which is elastically deformable in response to pressure exerted by said fluid.

25. A hinge for an item of furniture having a main structure and a closure for the main structure, comprising a first hinge component mountable on the main structure; a second hinge component mountable on the closure; and a damping device located in one of said first and second hinge components connecting said first and second components, said damping device including a housing defining at least a portion of the exterior of said damping device having a compartment, a partition in said compartment dividing the latter into first and second chambers, a body of hydraulic fluid in said compartment, means for transferring said fluid between said chambers, and a rod having a first end portion which is connected to said partition and a second end portion which is connected to one of said components, said partition comprising a piston, a retaining ring defining a space with said piston, and a piston ring in said space movable axially of said rod, said transferring means including a slit in said piston ring.

26. The hinge of claim 25, wherein said transferring means further includes at least one flow channel in said piston and at least one flow channel in said retaining ring.

27. The hinge of claim 26, wherein said piston ring is arranged to close said flow channel of said piston upon movement of said components to a closed position.

28. The hinge of claim 25, wherein said compartment has a predetermined diameter and said piston ring has a diameter substantially equal to said predetermined diameter, said piston and said retaining ring having diameters smaller than said predetermined diameter.

29. The hinge of claim 25, wherein said transferring means further includes at least one flow channel in said piston, said piston ring being provided with a protuberance receivable in said flow channel.

30. The hinge of claim 25, wherein said piston ring is provided with at least one protuberance which faces said retaining ring and is arranged to bear against the same upon movement of said components to an open position.

31. The hinge of claim 25, wherein said piston ring has a surface portion which is inclined with respect to the axis of said rod and faces one of said chambers.

32. The hinge of claim 31, wherein said surface portion is substantially unbroken.

33. The hinge of claim 31, wherein said piston ring has an edge portion and said surface portion is provided on said marginal portion.

34. The hinge of claim 31, wherein said transferring means further includes at least one flow channel in said piston and said piston ring is arranged to close said flow channel upon movement of said components to a closed position, said fluid flowing from said one chamber to the other of said chambers during movement of said components to said closed position.

35. A hinge for an item of furniture having a main structure and a closure for the main structure, comprising a first hinge component mountable on the main structure; a second hinge component mountable on the closure; and a damping device located in one of said first and second hinge components connecting said first and second components, said damping device including a housing defining at least a portion of the exterior of said damping device having a compartment, a partition in said compartment dividing the latter into first and second chambers, a body of hydraulic fluid in said compartment, means for transferring said fluid between said chambers, and a rod having a first end portion which is connected to said partition and a second end portion which is connected to one of said components, said partition comprising a retaining member, a cover plate spaced from said retaining member, and a piston movable axially of said rod between said retaining member and said cover plate, said piston being provided with a sealing lip.

36. The hinge of claim 35, wherein said fluid flows from one of said chambers to the other of said chambers during movement of said components to a closed position and said sealing lip is inclined from said one chamber to said other chamber as considered in a direction radially outward of said rod.

37. The hinge of claim 35, wherein said transferring means includes at least one flow channel in said piston extending axially of said rod, said piston being arranged to move into engagement with said cover plate upon movement of said components to a closed position so that said cover plate closes said flow channel.

38. The hinge of claim 35, wherein said sealing lip is substantially unbroken.

* * * * *